(12) United States Patent
Huddy et al.

(10) Patent No.: US 7,921,800 B2
(45) Date of Patent: Apr. 12, 2011

(54) SYSTEM AND METHOD FOR COATING A FIRE-RESISTANT MATERIAL ON A SUBSTRATE

(75) Inventors: Michael D. Huddy, Orono, MN (US);
Janice B. Loebel, Sartell, MN (US);
Vaughn D. Zoller, Watkins, MN (US)

(73) Assignee: Pyrotite Coatings of Canada, Inc., Vancouver, BC (CA)

( * ) Notice: Subject to any disclaimer, the term of this patent is extended or adjusted under 35 U.S.C. 154(b) by 0 days.

(21) Appl. No.: 12/541,759

(22) Filed: Aug. 14, 2009

(65) Prior Publication Data
US 2010/0068535 A1 Mar. 18, 2010

Related U.S. Application Data

(63) Continuation of application No. 11/365,444, filed on Mar. 1, 2006, now Pat. No. 7,595,092.

(51) Int. Cl.
*B05C 1/08* (2006.01)
*B05D 1/28* (2006.01)

(52) U.S. Cl. ........ 118/663; 118/666; 118/708; 118/712; 118/66; 118/249; 118/262; 156/346

(58) Field of Classification Search .................. 118/663, 118/666, 708, 712, 66, 249, 262, 419; 156/39–46, 156/346–348; 264/333, 112, 113
See application file for complete search history.

(56) References Cited

U.S. PATENT DOCUMENTS

| 2,472,293 A | 6/1949 | Groven |
| 3,607,533 A | 9/1971 | Moore |
| 3,682,695 A | 8/1972 | Khelghatian et al. |
| 3,843,389 A | 10/1974 | Enomoto |
| 4,070,199 A | 1/1978 | Downing et al. |

(Continued)

FOREIGN PATENT DOCUMENTS

WO 9404330 3/1994

(Continued)

OTHER PUBLICATIONS

Yunsong, Study of the new type of light magnesium cement foamed materials, (2002) Materials Letters, 50 (1), pp. 28-31.

(Continued)

*Primary Examiner* — Laura Edwards
(74) *Attorney, Agent, or Firm* — Dorsey & Whitney LLP

(57) ABSTRACT

A method for coating a fire-resistant substance onto a carrier veil and products containing fire-resistant substances are provided. The method includes delivering a pliable carrier veil in a traveling web, drawing the carrier veil web through a reservoir defined by a nip of two rollers and containing the fire-resistant substance, where the carrier veil is coated with the fire-resistant substance. The method also includes controlling the amount of fire-resistant substance on the carrier veil web by setting a nip dimension between the two rollers, passing the carrier veil through the nip of the two rollers and providing the fire-resistant substance as a slurry suitable to coat the veil exiting the nip with a layer effective to provide a selected fire resistance. Heat is applied to the carrier veil sufficient to accelerate a curing reaction in the fire-resistant substance. A fire-resistant product includes a glass-based web, and a magnesium oxychloride complex materially coupled to the web, where the complex includes: $MgCl_2.mMg(OH)_2.nH_2O$; where m is between about 3 and about 7, and n is between about 6 and about 10.

20 Claims, 7 Drawing Sheets

U.S. PATENT DOCUMENTS

| | | | |
|---|---|---|---|
| 4,202,851 A | 5/1980 | Kroyer | |
| 4,315,967 A | 2/1982 | Prior et al. | |
| 4,528,238 A | 7/1985 | Alford | |
| 4,572,862 A | 2/1986 | Ellis | |
| 4,661,398 A | 4/1987 | Ellis | |
| 4,818,595 A | 4/1989 | Ellis | |
| 4,964,912 A | 10/1990 | Okabayashi et al. | |
| 5,039,454 A | 8/1991 | Policastro et al. | |
| 5,089,198 A | 2/1992 | Leach | |
| 5,089,296 A * | 2/1992 | Bafford et al. | 427/208 |
| 5,130,184 A | 7/1992 | Ellis | |
| 5,145,627 A | 9/1992 | Berion et al. | |
| 5,599,422 A | 2/1997 | Adams et al. | |
| 5,632,848 A * | 5/1997 | Richards et al. | 156/346 |
| 5,804,256 A * | 9/1998 | Schafer | 427/558 |
| 5,863,477 A | 1/1999 | Kawai | |
| 6,001,169 A | 12/1999 | Kawai | |
| 6,399,181 B1 | 6/2002 | Corder | |
| 6,468,942 B1 | 10/2002 | Sansalone | |
| 6,783,799 B1 | 8/2004 | Goodson | |
| 6,986,812 B2 * | 1/2006 | Dubey et al. | 118/259 |
| 2004/0079259 A1 | 4/2004 | Manig | |
| 2004/0101672 A1 | 5/2004 | Anton | |
| 2004/0118076 A1 | 6/2004 | Bezubic | |
| 2004/0139891 A1 | 7/2004 | Merkley et al. | |
| 2004/0266294 A1 | 12/2004 | Rowen | |

FOREIGN PATENT DOCUMENTS

| | | |
|---|---|---|
| WO | 2004113248 | 12/2004 |

OTHER PUBLICATIONS

Fernandez et al., "Influence of the Type of Ash on the Insulating Capacity of Fly Ash Mortars Used for Passive Protection against Fire," 2003 International Ash Utilization Symposium, Center for Applied Energy Research, University of Kentucky, Paper #58; Symposium held Oct. 22, 2003, p. 3, section 2.1.2, paragraph 2.

* cited by examiner

SYSTEM AND METHOD FOR COATING A FIRE-RESISTANT MATERIAL ON A SUBSTRATE

CROSS-REFERENCE TO RELATED APPLICATION(S)

This application is a continuation of U.S. application Ser. No. 11/365,444, filed Mar. 1, 2006, entitled "System and Method for Coating a Fire-Resistant Material on a Substrate", issued as U.S. Pat. No. 7,595,092, which applications is hereby incorporated by reference in its entirety.

FIELD OF THE INVENTION

The present invention relates to processes for coating fire-resistant materials onto a substrate, and more particularly to a process for combining a coated substrate and an impregnated veil material to form a reinforced substrate having fire-resistant properties.

BACKGROUND OF THE INVENTION

Fire retardant chemicals have been used to impregnate cellulosic-based materials such as plywood, oriented strand board (OSB), and particleboard panels, in order to yield fire-resistant products. However, impregnation with fire retardant chemicals is an expensive procedure and a complicated process, because, in order to be effective, the chemicals must be applied under pressure in a closed pressure cylinder, which requires that a vacuum be pulled first on the load to extract the air from the wood cells prior to pressurization. Furthermore, impregnation of cellulosic materials with fire retardant chemicals adversely affects the long-term structural stability of the cellulosic materials.

Fire retardant coatings have also been used to reduce the surface flammability and improve burn-through resistance of wood products, and other flammable materials. Compositions and uses for fire retardant coatings are discussed further in U.S. Pat. Nos. 5,130,184; 4,818,595; 4,661,398; and 4,572,862, each of which are incorporated by reference in their entireties. Application of fire retardant coatings by brushing, spraying and sheet lamination is known. Brushing or spraying application methods alone, however, can make it difficult to achieve a coating having a uniform thickness and desired surface characteristics. In addition, the coatings may be required to dry or set before additional coatings can be applied in order to build a sufficient volume of material to achieve the desired fire-resistant properties. Application by preparing a separately formed sheet of fire retardant coating material and laminating it to the substrate involves the use of an adhesive layer and has disadvantages related to the process of manufacturing.

Fire retardant coatings can also be used to coat strands of fiber or to impregnate fabrics. Spray-coated strands of chopped fiberglass, for example, may be used as a fire-resistant coating on cellulosic panel substrates, as in the Blazeguard® construction panel product. Suitable fabrics used in fiber impregnation with fire-retardants include, for example: non-woven needled polyester fabrics, non-woven fiberglass or glass-based veil, woven fiberglass, woven carbon cloth, and woven aramid fabric ("Kevlar"). Fabrics of quartz, nylon, or other natural or synthetic or inorganic fibers, woven or unwoven, may also be used. However, the process of impregnating fabric with a fire retardant coating raises challenges. The volume of fire retardant coating impregnated in fabrics can vary, depending on the thickness and porosity of the fabric and the volume and physical qualities of the coating material used to impregnate the fabric. Variations in the volume of the impregnated fabric may affect the effectiveness of the fire retardant coating when the fabric is applied to a flammable substrate. This may make it difficult to consistently produce a product with a desired level of fire resistance.

Because many building products with greater or lesser fire-resistant qualities compete as commodities, production methods used to make such products must be efficient and rapidly scalable in volume. In addition, production methods also need to yield consistent products that meet the standards of the applicable building code.

It is an object of the present invention to provide a system and method for efficiently coating substrates with fire retardant materials in which the dimensions and/or volume of the coating is controlled while yielding a fire-resistant product that maintains a high degree of structural integrity over time, at high temperatures, and during exposure to high temperatures over extended periods.

BRIEF SUMMARY OF THE INVENTION

According to an embodiment of the present invention, a method for coating a fire-resistant substance onto a carrier veil is provided. The method includes the steps of: delivering a pliable carrier veil in a traveling web, and drawing the carrier veil web through a reservoir defined by a nip of two rollers containing the fire-resistant substance. The carrier veil is coated with the fire-resistant substance. The method also includes controlling the amount of the fire-resistant substance on the carrier veil web, where controlling includes setting a nip dimension between the two rollers, passing the carrier veil through the nip of the two rollers and providing the fire-resistant substance as a slurry suitable to coat the veil exiting the nip with a layer effective to provide a selected fire resistance, and applying heat to the coated carrier veil sufficient to accelerate a curing reaction in the fire-resistant substance. In some embodiments, the carrier veil is a glass-based veil. Alternatively, the carrier veil may be a bound fiberglass mat. The reservoir of fire-resistant substance may include an amount of substance fed to and maintained at an adjustable nip that is predetermined and/or controlled. The fire resistant substance may include a wet slurry that is a precursor to magnesium oxychloride, or a wet slurry that is a precursor to magnesium oxysulphate, or combinations of both. For example, when the magnesium oxychloride-based fire-resistant substance completes its curing process, the compound is magnesium oxychloride having the formulation: $MgCl_2.mMg(OH)_2.nH_2O$, where m is between about 3 and about 7, and n is between about 6 and about 10, as determined by x-ray diffraction or x-ray phased analysis. Alternatively m may be about 5 and n may be about 8. For purposes of the present invention, the term slurry means a wet mixture of a precursor material, that, when cured, yields magnesium oxychloride, magnesium oxysulphate, or combinations of both. Examples of such slurries are identified in previously mentioned U.S. Pat. Nos. 5,130,184; 4,818,595; 4,661,398; and 4,572,862.

In certain embodiments, controlling the amount of fire-resistant substance includes depositing a selected amount of fire-resistant substance per square unit of substrate.

According to certain embodiments, the method may further include coating a first layer of a fire-resistant material on a substrate, and depositing the coated carrier veil as a second layer over the first layer of fire-resistant material. The substrate receives the coated carrier veil as it passes under the two rollers where the veil is coated. In this embodiment, the first layer may be roll coated, flow coated, or spray applied. The substrate may also be pre-processed to increase its surface area in order to enhance bonding with the first layer of fire-resistant substance. In some embodiments, the substrate contains wood products and the step of coating a first layer of fire retardant substance to the substrate includes, at a first station, coating with a roll coater a first slurry of fire retardant material diluted sufficiently to wet cells of the wood products. In some embodiments, the carrier veil may be a glass-based continuous web extending between multiple substrates. The substrates may be positioned with a predetermined gap which is substantially preserved until after receiving the deposited coated veil. A cutting means may be subsequently applied to the continuous web at the predetermined gap in order to separate the multiple substrates.

In addition to coating a first layer of a fire-resistant material on a substrate followed by depositing the coated carrier veil, methods may further include depositing a third layer of fire-resistant substance over the first layer and the coated carrier veil. The third layer may be deposited by roll coating, flow coating, or spray coating, for example. When heat is applied to the layers of fire-resistant-substance, infrared radiation may be used in order to initiate a penetrating curing process of the layers of fire-resistant material. In some embodiments, the applied heat source is removed and the heated layers of fire-resistant substance are allowed to cure. Alternatively, the substrate may be removed from heat and a finishing layer may be applied over a coated portion of the substrate. An additional layer may be applied over the third layer of fire-resistant material which may include, for example, another substrate, wood veneer, laminates, paper and plastic film. In certain methods, the substrate may be weighed before coating the substrate with the first layer and after coating the substrate with a final layer of fire-resistant material, i.e., the second layer or third layer of fire-resistant material.

According to another embodiment of the present invention, a fire-resistant product includes a magnesium oxychloride complex, $MgCl_2.mMg(OH)_2.nH_2O$, where m is between about 3 and about 7, and n is between about 6 and about 10, and a glass-based web materially coupled to the complex. In a more specific embodiment, m is about 5 and n is about 8. According to certain embodiments, the web is impregnated by the complex.

In yet another embodiment, a fire-resistant product includes a glass-based web comprising a first side and a second side, a magnesium oxychloride complex materially coupled to the web, where the complex includes: $MgCl_2.mMg(OH)_2.nH_2O$, where m is between about 3 and about 7, and n is between about 6 and about 10, and a layer of magnesium oxychloride complex materially coupled on a first or second side of the web, where the complex includes: $MgCl_2.mMg(OH)_2.nH_2O$, where m is between about 3 and about 7, and n is between about 6 and about 10. In a more specific embodiment, the complex is composed of $MgCl_2.mMg(OH)_2.nH_2O$, where m is about 5 and n is about 8. In a further embodiment, another layer of magnesium oxychloride complex is materially coupled on the other of the first or second side of the web, where the complex includes: $MgCl_2.mMg(OH)_2.nH_2O$, where m is between about 3 and about 7, and n is between about 6 and about 10. In a more specific embodiment, m is about 5 and n is about 8 for another layer of the magnesium oxychloride complex. In some embodiments, at least one of the layers of a slurry that is a precursor to cured magnesium oxychloride is roll coated on the web.

In another embodiment, a fire-resistant product includes a glass-based web, a magnesium oxychloride complex materially coupled to the web, where, when cured, the complex includes: $MgCl_2.mMg(OH)_2.nH_2O$, where m is between about 3 and about 7, and n is between about 6 and about 10, a layer of magnesium oxychloride complex materially coupled on the web, where the complex, when cured has the formulation: $MgCl_2.mMg(OH)_2.nH_2O$, where m is between about 3 and about 7, and n is between about 6 and about 10, and a substrate materially coupled to the layer of magnesium oxychloride complex. In a further embodiment, another layer of magnesium oxychloride complex is materially coupled to the web, where the complex, when cured has the formulation: $MgCl_2.mMg(OH)_2.nH_2O$, where m is between about 3 and about 7, and n is between about 6 and about 10. According to some embodiments, each cured magnesium oxychloride complex is comprised of $MgCl_2.mMg(OH)_2.nH_2O$, where m is about 5 and n is about 8.

DETAILED DESCRIPTION OF THE INVENTION

Figure 1:
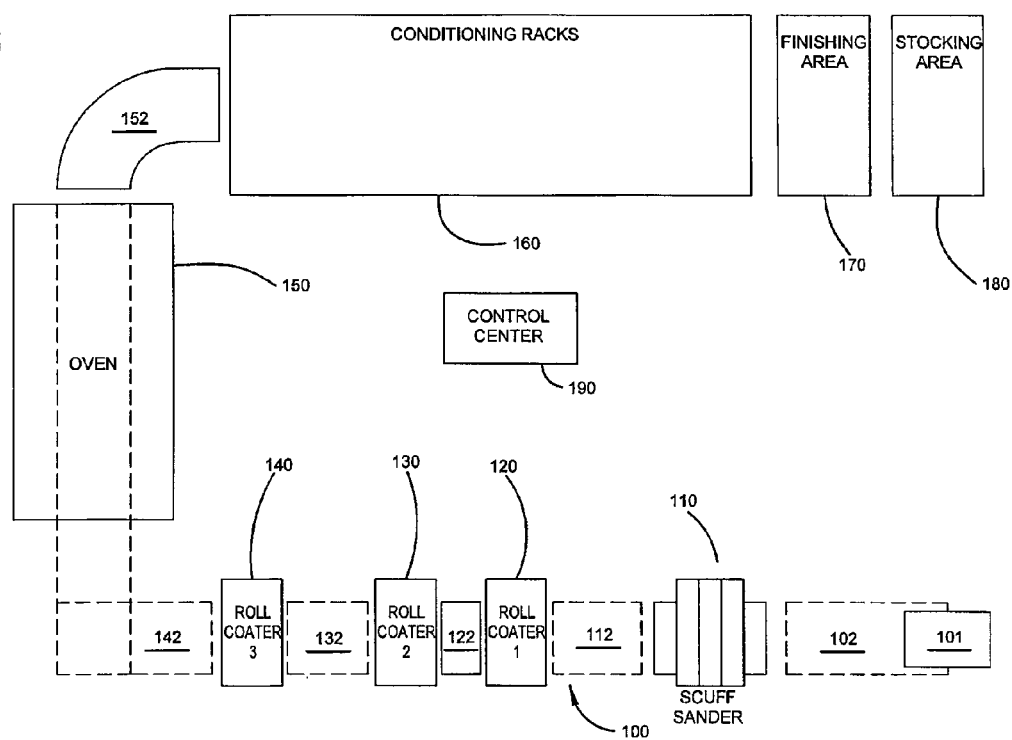
FIG. 1 depicts a plan view of a production line that may be implemented according to embodiments of the present invention.

Fire-resistant Coating Overview. For purposes of the present discussion, the term fire-resistant encompasses any type of fire barrier substance, such as fire retardants, flame retardants, and flame-resistant materials that can be prepared in the form of a slurry; and the terms impregnate and coat encompasses any degree, level, or amount of intake of slurry into a porous carrier material, such as saturation, dispersion with some entrained air or surface coating.

Fire-resistant coatings such as Pyrotite™, a magnesium oxychloride material with filler, and other similar substances, e.g., magnesium oxychloride and/or magnesium oxysulphate or the like without filler, are cementitious materials that provide fire barrier protection and may be used to coat substrates, according to embodiments disclosed herein. Specific chemistries of fire barrier materials that provide fire protection, which may be used in accordance with the systems and methods of the present invention, are described in U.S. Pat. Nos. 4,572,862; 4,818,595; and 5,039,454, which are hereby incorporated by reference in their entireties. Typical fire-resistant coatings contain 3-7 molar magnesium oxychloride, are 10-125 mils thick, and include a filler such as inert sand, gravels, crushed rocks, silica flour, pumice, vermiculite, volcanic ash, perlite, wood shavings, and/or mineral fibers. The thickness of the coating on the substrate varies according to the level of fire resistance desired in a particular application, and the filler in the slurry varies depending on desired handling qualities during manufacturing and resulting product characteristics. Substrates that may be coated with fire-resistant materials may include, for example, wood, plywood, OSB, plastic, metals, wallboard, medium density fiberboard (MDF), and particle board, or any material or composite material suitable for coating. Typical substrates may take the form of a planar sheet, such as a 4 foot by 8 foot panel, but smaller and/or larger substrates are also equally possible.

According to the present invention, systems and methods for forming a fire-resistant layer on a substrate typically include substrate pre-treatment, coating, heating, curing, finishing, and stacking.

Pre-treatment. According to certain embodiments of the present invention, a substrate to be coated with fire-resistant material may be pre-treated in order to increase the bonding area of the substrate available at the microscopic level and to roughen the surface. The increased bonding area provides an increased amount of available surface for fire-resistant material to adhere. This may be particularly useful for composite cellulosic materials formed with pressure and/or heat that have resulting smooth surfaces. Scuffing, sanding, and introducing substrates to a chemical bath are methods to increase the substrate available bonding area, because, when cellulosic material is subjected to such treatments, interstitial spaces open to increase the porosity and permeability of the cellulosic surface. This permits, increased penetration by wet, fire-resistant materials. In addition to opening interstitial spaces in cellulosic material, scuffing may create a surface toothing allowing for increased physical bonding with the wet, fire-resistant materials. This is because as a cementitious fire-resistant substance cures and dries, it adheres more strongly to a rough surface, as compared to a smooth surface.

Coating Methods. Coating substrates with fire-resistant materials, according to the present processes, includes depositing flowable or viscous layers of a homogenous mixture (often called a slurry) of fire-resistant material onto a substrate. For example, one or more rollers, flow coaters, or sprayers may be used as vehicles to deposit a layer of fire-resistant material on a scuffed substrate. In one example, when the substrate is passed between a feed roll and a coating roller, the flowable material is deposited onto the substrate. The thickness of the layer of flowable material deposited may be controlled by adjusting the mechanical features of the coating machine such as the nip, e.g., the distance between rollers, and the speed at which the rollers rotate. For reverse roll coaters, for example, the coating roller deposits more material as it rotates faster and vice-versa. In addition, the thickness of the layer of flowable material may be controlled by controlling the pressure one or more rollers exerts on a coated substrate. Typically, the thickness of the finished layer of fire-resistant material is 0.010-0.125 inches or 10-125 mils. Depositing an initial slurry of fire-resistant material on the entire surface of a substrate serves as a wetting step in order to set up a strong, continuous bond between the substrate and the fire-resistant material, e.g., between cells on a wood substrate and a slurry. Complete wetting of the surface is desirable in order to begin the penetration process of the fire-resistant material into the substrate. A strong bond between the board and the fire-resistant material also improves the foundation for layers that are subsequently deposited. Without wetting of the substrate surface, any additional layers deposited on the substrate may bond to it less strongly.

Additionally or alternatively, fire-resistant material may be deposited on, or may impregnate or coat, a web or veil of carrier material, which may subsequently be deposited over a substrate. For example, one or more rollers, flow coaters, or sprayers may be used as devices to deposit fire-resistant material on a veil material. Additionally, a pan bath may be used to impregnate a veil material. Veil material may include a variety of pliable and porous fabrics such as woven or spunbound fiberglass, polyester, nylon, wool, carbon steel, or other fiber or filament materials suitable for receiving viscous fire-resistant coating. Preferably the veil material is available in a continuous roll several hundred feet long and at least as wide as the entire substrate (typically four feet), so that a continuous feed of a single web of coated carrier material onto the substrate may occur. Alternatively, the veil material may be slightly narrower than the width of the panel for use with panels having beveled edge-treatment, for example.

One suitable veil carrier material is a wet-formed glass fiber veil comprised of randomly dispersed glass fiber bonded together with a resinous binder system. While light in weight, the veil must have sufficient durability to be spooled out, coated and placed on the substrate. Several different grades may be used, with a nominal weight of 1.3 to 2.5 lbs per one-hundred square feet (CSF). Available commercial veils with these weights have the following further characteristics:

| Weight | Tensile MD Min./Roll (avg.) | Squareness Ratio | Cure (Hot Wet Tensile Retention) |
| --- | --- | --- | --- |
| 1.35 lbs./csf | 60 | 2.5 | Min. 60% |
| 1.6 lbs./csf | 60 | 2.5 | Min. 60% |
| 1.8 lbs./csf | 60 | 2.5 | Min. 60% |
| 2.35 lbs./csf | 65 | 2.5 | Min. 60% |

In some instances the veil material is wider than the substrate in order to ensure complete substrate coverage. For example, a mat or veil of fiberglass material having the same or slightly greater width as its target substrate may pass through a reservoir of viscous fire-resistant material and then be aligned with and applied to the surface of the substrate. In one embodiment, a substrate having a first layer of deposited fire-resistant material may be covered with a web of coated or impregnated fiberglass material that provides a second layer of fire-resistant material. The fire-resistant material on each of the substrate and the fiberglass material come together to form an intimately strong and continuous bond without requiring an adhesive. Removing use of additional adhesives reduces the number of steps in manufacturing the fire-resistant coated substrates, thereby simplifying the manufacturing processes and reducing manufacturing costs. In addition, adhesives may be undesirable in fire-resistant substrates, because they often break down in the presence of moisture and heat. Furthermore, using adhesives in the manufacture of fire-resistant substrates adds production time, creates the presence of solvents and VOCs, and requires handling and storage.

The web or veil carrier material may have a variety of thicknesses and densities, which may affect the volume of the fire-resistant material drawn into and held in the veil, and the resulting overall density of a layer deposited by this means. The thickness of the mat or veil is one determinant of the volume of the fire-resistant coating residing on and in the carrier material and the overall density of the impregnated veil. This is because, as the thickness of the mat or veil increases, the amount of fire-resistant material that can be carried by the veil increases. Some veil materials have a degree of loft that allows both air and the fire-resistant material to be present in the coated veil. In addition, the mat or veil material may be more or less impregnated depending on the fabric dwell time in a bath, or "virtual bath" as will be described further below, of fire-resistant material. According to embodiments of the present invention, rollers may also be used to control the volume and density of the veil-borne layer, because as the veil passes through a series of rollers, fire-resistant material may be squeezed out of the veil due to the pressure the rollers exert on the veil.

A coated substrate may be further processed after application of the veil-borne layer in order to achieve a certain coating dimension or finish, e.g., thickness and appearance. In this further processing step, an additional coating of fire-resistant material may be deposited on the substrate, an existing layer may be smoothed or a portion of the coated material may be removed in order to achieve a desired thickness. Machinery that may be used to add and/or control the thickness or dimensions of the coatings or their finish include for example, reverse roll coaters, flow coaters or spray nozzles for adding additional layers of fire-resistant material and rollers for compression and finish.

Mechanical features of coaters are discussed further below in relation to FIGS. 3-7.

Substrates may be passed between coaters using transport mechanisms such as chains, rollers, or conveyor belts. This allows a substrate to pass through multiple coaters spaced apart. For example, coaters may be arranged from 5 to 15 feet apart and may receive closely spaced substrates from speed-controlled transport devices, thereby enabling a near-continuous process for coating substrates with fire-resistant materials. Although the finished coated panels are individual units and the substrate panels used as input to the process are also individual units, it is desirable to make the process as continuous as possible. The veil-borne layer produced by applying fire-resistant material to a continuous web and delivery of that coated web onto the substrate permits a continuous production process.

Curing. Curing is the process of converting a cementitious slurry into a solid. Curing is generally achieved through thermal treatment and/or exposure to ambient conditions. Partial curing means that the slurry has partially solidified. Subsequent to the steps for coating substrates, processes for further treating coatings on the substrates may include heat treatment. Heat treatment initiates and/or accelerates the curing processes of the coatings but may also drive off water that contributes to fire resistance. Controlling the amount of heat a coated substrate is exposed to may allow for controlling curing and water loss. Both the curing rate and water content of fire-resistant layers need to fall within acceptable ranges in order to produce efficiently a fire-resistant substrate having a specified amount of fire-resistant material with the requisite properties. An oven may provide controlled heat treatment in which substrates pass through the oven along a series of rollers, for example. Factors that may be controlled in an oven may include temperature, humidity, intensity of heating units, air speed and transport speed.

With infrared radiation delivered from lamps or burners in an oven setting, heat is able to penetrate through the coating outer surface to underlying material in order to initiate and/or accelerate the curing process throughout the deposited fire-resistant material. In one example, a substrate spends 2 minutes inside of the oven in order to initiate the curing process. Thus, depending on the length of the oven, the speed at which the substrates move will be adjusted to satisfy the dwell time requirement. Curing processes in the fire-resistant layers on a substrate need not be fully completed before exiting an oven area. Instead, the exposure to heat initiates and accelerates the curing processes. It is desirable to cure the fire-resistant material gradually once curing has been initiated, because (in general) the longer the wet, fire-resistant material is in contact with the substrate, the deeper the material bond becomes. However, a cure that is too slow causes a slowdown in production. Therefore, controlling the amount of time the coated panel is exposed to curing initiation temperatures, i.e. in a heated oven, may allow for the curing process to proceed at a desired rate while also achieving a strong material-substrate bond, i.e., a bond that is strong enough to hold-up over time and use. Typically, the substrates will cure over a period of 1-3 hours after being exposed to oven heat for a short period of time, e.g., 2-4 minutes. In one embodiment, the amount of heat delivered is measured by measuring the surface temperature of the top of a coated substrate in the oven area. For example, it has been found that a minimum surface temperature of 150-175 degrees F. (65-80 degrees C.) is desirable to initiate cure. In another embodiment, the amount of heat delivered is measured by measuring the btu's per square unit of area delivered during the time a coated substrate passes through the oven. For example, it has been found that a minimum btu amount of 15,000 btu's per square foot is desirable to initiate cure.

In certain embodiments, the oven may include multiple zones where conditions may vary. For example, in a three-zone environment, a first zone may have a temperature and humidity different from the other two zones. The speed of conveyors/rollers may also be controlled so that the substrates dwell in one or more of the heated environments for a set period of time. The treated, coated substrates with curing initiated may be moved to open air racks which space the coated substrates about 1" apart, to allow excess heat from exothermic curing to dissipate. The racks holding coated substrates are placed in a conditioning area which has an environment of controlled temperature, e.g., 60-80° F. and humidity from 40% to 99% until the drying and curing processes are complete, or until the curing process has progressed enough, e.g., 1-3 hours, so that the substrates can safely be finished and stacked. Facilitating the curing process by controlling the temperature and humidity yields a cementitious material having the requisite stability, strength, and $H_2O$ content for fire-barrier products.

In certain embodiments, finishing the cured and coated substrates may include trimming any excess materials from the substrate. For example, a fiberglass veil may extend beyond the edge of a substrate, or the coating may need to be smoothed or otherwise treated for some cosmetic purpose. Finished substrates may be stacked for subsequent sanding, painting, texturing, veneering, or other manufacturing, for example.

Production Lines. FIG. 1 depicts a plan view of a production line 100 that may be implemented according to embodiments of the present invention. Production line 100 includes substrate feeding area 102, which transports each individual substrate 101 to a scuff sander 110. Feeding area 102 may feed substrate 101 to scuff sander 110 via a powered roller pathway, for example. In addition, or alternatively, substrate feeding area 102 may be constructed using a conveyor belt that controllably feeds each substrate 101 to scuff sander 110.

Scuff sander 110 may include scuffing rolls, sanding rolls, or sanding belts that include with bristles or other sanding materials, which increase the amount of surface area on substrate 101 and may open interstitial spaces in cellulosic materials.

In additional or alternative embodiments, substrate 101 is treated by a device (not shown) that scarfs the edges, i.e., processing the edges so that they form an angle of 45°. Alternatively, the edges may be processed by a device (not shown) to form a beveled or rounded edge.

Subsequent to scuffing and/or scarfing or beveling, substrate 101 is passed along a transport path to transport device 112, which moves substrate 101 to a first roll coater 120, where substrate 101 is coated with a first coating or a pre-coating of a fire-resistant material. First roll coater 120 may deposit the pre-coating of fire-resistant material using a single top coater, which may include a spreader roll, or may deposit a first coating of fire-resistant material using a single side roll coater, a reverse single side roll coater, a flow coater, or a spray coater, for example. As the coated substrate 101 passes through and out of first roll coater 120, transport device 122 delivers coated substrate 101 to second roll coater 130. The first coating or pre-coating will typically be only a fraction of the total amount of fire-resistant material applied to a substrate, e.g., 10% to 40%, preferably, 20% to 30%.

Second roll coater 130 is a standard direct roll coater modified to include an unwind stand to hold a roll of carrier material, such as a web of fiberglass veil and a path for leading the web into the nip between the coating rollers. The web of veil material is pulled into the roller nip and passed through a bath of slurry formed in the space between the rollers so that the glass fiber veil is impregnated with the slurry. The fiberglass veil impregnated with fire-resistant material is then fed out from the nip and deposited on a top surface of coated substrate 101 as it passes between two rollers. The contact and surface tension forces between the coated substrate and the impregnated veil provide sufficient "stiction" to help draw the impregnated veil out of the nip and hold it down on the coated substrate. The roller speed may assist in the delivery of the impregnated veil to the substrate at a rate matching the substrate transport. The impregnated fiberglass material and the pre-coating on substrate 101 combine intimately to form a continuous bond.

If a continuous fiberglass veil has been applied at the second roll coater 130, at some point in the process the substrates need to be singulated. For example, when the transport direction of the coated substrates is changed, e.g. from longitudinal travel to lateral travel, the adjacent substrates need to be separated from one another before changing direction. This may be done by a suitable separating apparatus such as a scissor, laser, cutting bar, router blade, or water jet cutter (not shown in FIG. 1).

According to FIG. 1, the veiled and coated substrate 101 is then transported out of second roll coater 130 to transport device 132, which subsequently feeds substrate 101 to third roll coater 140. Third roll coater 140 may provide an additional coating of fire-resistant material, may finish the material to a desired thickness or texture/smoothness, or may treat the substrate using any suitable method or combination of methods. The actions in the third roll coater may be designed to ensure the proper amount of material has been applied to meet product specifications, to achieve cosmetic effects for the surface of the coated substrate 101 not fully achieved in prior steps and/or to help control the dimensions and/or the volume of the finished substrate. The aforementioned coaters are discussed further below in relation to FIGS. 3-5.

In some embodiments, subsequent to receiving coatings, the raw edges of the substrate 101 are wiped with slurry. However, the raw edges may have slurry applied at any suitable stage in the production process.

Transport device 142 receives each substrate 101 from third roll coater 140 and dispatches each substrate 101 laterally to oven 150, where the curing process is initiated. Oven 150 may take a variety of dimensions, but for the purposes of this embodiment, oven 150 is about 40 feet long and 10 feet wide, or at least wide enough to accommodate substrate 101 lengthwise or widthwise. The top of the oven may include infrared or other suitable heaters to deliver heat into the coated substrate. From oven 150, coated substrate 101 passes to transport device 152 which may include an elevator with paddle handles in order to lift and load coated substrate 101. Transport device 152 delivers coated substrate 101 to conditioning area 160 so that the coatings on the substrate may cure to form a cementitious coating and adhere to the substrate. This is because oven 150 initiates curing but does not cause the coating to cure fully. Thus, in the conditioning area, as the coating further soaks into the substrate while curing, a stronger, deep, penetrating bond between the coating and the substrate results. More specifically, the deep, penetrating bond forms between the surface of the substrate and the cured coating of cementitious material. Racks may be placed on a conveyor system, e.g., rail-type conveyor, roller conveyor, chain conveyor, or cart system and be slowly pulled through a conditioning area, and may hold the substrates, for example, for up to 3 hours in order to allow for a slow cure and for forming an intimate penetrating bond between the fire-resistant material and coated substrate 101. Coated substrate 101 is finished in finishing area 170, e.g., trimming and labeling, and stacked in stacking area 180. As noted, in finished product, the cured coating may vary between 10-125 mils (weight about 2.1 lbs.-27 lbs. per panel of 32 ft$^2$).

A control center 190 may be implemented according to embodiments of the present invention in order to sense and control the parameters of the production process. For example, control center 190 may adjust oven dwell times, or may adjust the speed at which one or more pieces of equipment operates so that overall production is conducted at the desired rate. Given the interdependence of the various operations, it may be necessary for the control center 190 to monitor and change transport speeds, as well as to control flow of fire-resistant materials by pipe from one or more sources to the roll coater where it is to be used. In addition, control center 190 may control oven temperature or other equipment variables for production in real time so that, for example, changes in ambient conditions that may affect drying and curing of the fire-resistant substrate can be accommodated. In another example, control center 190 may control the speed of conveyors and rollers so that lags in production can be accommodated for. Control center 190 may also collect data for use in statistical process control (SPC) or quality control processes in order to give feedback on the line, for example.

Figure 2:
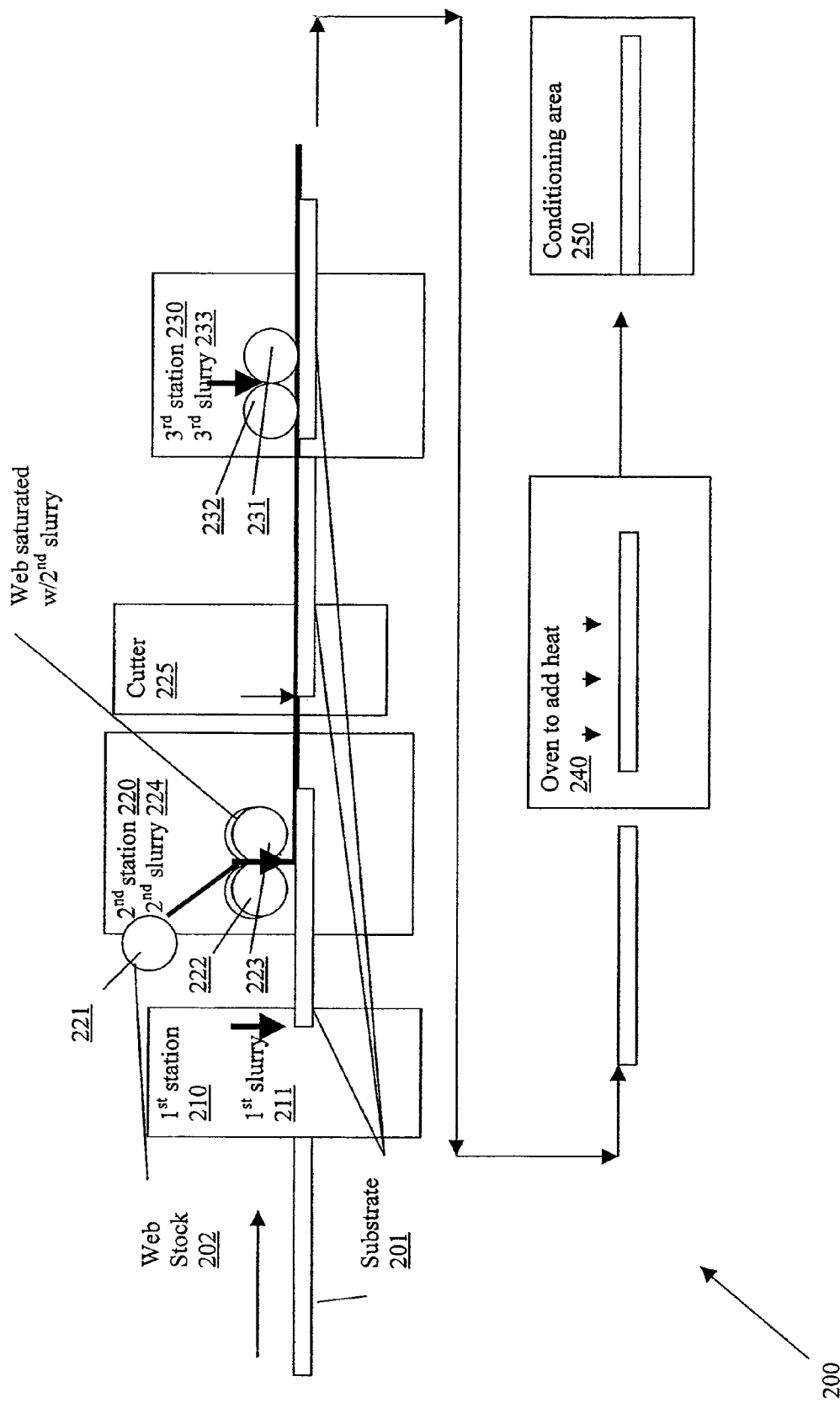
FIG. 2 depicts a schematic block diagram of another production line that may be implemented according to embodiments of the present invention.

FIG. 2 depicts a schematic block diagram view of another production line 200 that may be implemented according to embodiments of the present invention. Production line 200 includes a series of coater stations to deposit fire-resistant coatings in slurry form in several stages. The production processes include delivering a substrate 201 to first station 210, which deposits a first slurry 211 on substrate 201. The first slurry is formulated to cause wetting of the substrate as a step preliminary to the later stations.

Production line 200 continues by passing coated substrate 201 into a second station 220 which includes roller 221 for guiding material from web stock 202 (a carrier material, such as a fiberglass veil), into and through the nip between rollers 222 and 223 where impregnation of the web stock 202 with a fire-resistant material slurry 224 takes place. More specifically, the impregnation occurs at the top portion of rollers 222 and 223 and as the material passes through rollers 222 and 223. Rollers 222 and 223 are also used for directing the impregnated web stock 202 on to wetted substrate 201. Slurry 224 is contained in a nip reservoir or a "virtual bath" in the space between the top portion of rollers 222, 223. This type of reservoir has been found to be sufficient to produce the desired impregnation of the web material passing through the nip between rollers 222 and 223. The amount of slurry to be deposited on web stock 202 from the reservoir of slurry 224 is determined in part by the distance between rollers 222 and 223, an adjustable dimension in roll coaters. The "virtual bath" may also be considered a vertical bath, because the web stock 202 is impregnated with slurry as it passes generally vertically through the bath of slurry. As the impregnated web stock 202 comes out of the nip and lays onto the wetted substrate 201, the slurry in the web stock begins to bond with the slurry on the wetted substrate.

Following the coating processes described above, the web stock 202 may be cut at the edge of the substrate 201 (between substrate pieces) at cutter 225, which may include a water jet cutter, for example. Cutting the web stock to separate adjacent substrates reduces the likelihood of breaking the web/ substrate bond due to forces transmitted by the web from movement of an adjacent substrate. In addition, coated, veiled substrate 201 is able to move independently of the veil and of the other substrates directly after substrate 201 exits the second station 220 where the veil was deposited.

Where finishing is desired, production line 200 passes the web-covered and slurry-coated substrate 201 to a third station 230 which deposits a third slurry 233 on coated substrate 201. The third slurry 233 is introduced to rollers 231 and 232 at a top portion of the rollers, and the amount of slurry that is deposited on coated substrate 201 is determined by the nip of the rollers, or the space between rollers 231 and 232. The third station 230, in addition to depositing a third layer of slurry 233, serves to smooth or texture and to help control the dimension of the materials on coated substrate 201.

The coated substrate 201 is then transported from the third station 230 to oven 240 to add heat to the fire-resistant coating layers to initiate the coating curing process and then transported to conditioning area 250 where the coatings can continue to undergo the curing process.

One dimension of process control in the system just described is to determine the weight of fire-resistant material applied to a substrate 201 as it passes through the stations 210, 220, 230. In one embodiment, the substrate 201 may be weighed before entering the first station 210 and after exiting the second station 220 and/or the third station 230. For example, if substrate 201 is to receive a target amount of fire-resistant materials, the uncoated substrate may be weighed to determine the starting weight and after exiting third station 230 to determine whether the current production settings yield the target amount of fire-resistant material on the coated substrate materials, e.g. weight (0.3-0.75 pounds per square foot) and/or thickness (10-125 mils). Alternatively, in another embodiment, the thickness of the coating may be measured by mechanical means such as a roller caliper or by passing sound waves through the coating. The production process may remain continuous even while weighing the substrates because conveyors with weighing capabilities may be used as weighing stations while at the same time transporting or redirecting the substrate through the production line.

In certain embodiments of the present invention, the substrates to be coated are separated by a short distance when undergoing application of the impregnated web, i.e., ¼" to ½" apart, and transported along the production line into and through the coater that applies the impregnated web while maintaining the small separation. This minimizes material waste and permits the process to be near-continuous notwithstanding the separate substrate units. Upon cutting the web material between closely spaced substrates, the substrates may continue to be closely spaced or may be transported at a greater separation distance with respect to the other substrates.

In one embodiment of the present invention, the substrate is coated with only two layers, a first wetting layer of slurry and a second impregnated veil borne layer. According to this embodiment, once the slurry-impregnated veil is deposited onto a pre-coated substrate, the veil is cut at the trailing edge of the substrate to separate one coated substrate unit from the next following one, and the separate coated substrate is subsequently weighed and transported to an oven in order to initiate curing of the slurry material. The heated coated substrate may be transported to a conditioning area and subsequently may be sent to a finishing area.

The impregnated veil layer may be adequately smooth or it may be made rough intentionally. Having a rough outer surface once the fire-resistant material cures may be useful for subsequent applications, e.g., when bonding the substrate with other finish layers such as melamines or other laminates or plastic films, wall papers, veneers, or other layers suitable for depositing on cured fire-barrier material. Here an adhesive or glue would normally be used, taking advantage of the rough surface. Alternatively, a smoother surface may be used for bonding once the substrate exits an oven area and before curing is completed. For example, another layer such as another substrate, a laminate, or veneer may be laid on the coated surface of the substrate while it is still wet and before the coating can significantly cure. The laminated or veneered material may form a bond with the uncured coating on the substrate, and the laminated or veneered panel may then be stored in a conditioning area for further bonding and curing.

The above-described production lines are only a few embodiments of production lines that may be implemented according to the present invention, and are not intended to be limiting. For example, a production line may include an area for adding a subsequent substrate over the coated and veiled substrate in order to form a product having a fire-resistant material between the two substrates rather than on an exposed side of the substrate. The example production line may be further configured to coat one or more of the exposed sides of the substrate. In another example, the production process may allow a substrate-exposed side of a pre-coated substrate to be covered by a coated side of another pre-coated substrate. In yet a further example, a bare substrate may be covered by a layer of Mylar or other polyester film and then may be coated with a fire-resistant material impregnated web. The polyester film serves as a releasing layer allowing the formation a web-impregnated fire-barrier product without a substrate such as a wood panel. In still a further example, the veil material may be cut-to-size and then be impregnated by the slurry of fire-barrier material. The pre-cut impregnated veil by then undergo subsequent processing steps or may be a complete product after receiving the slurry. From the aforementioned examples, one skilled in the art can discern a variety of production line configurations that may be implemented according to embodiments of the present invention.

Figure 3:
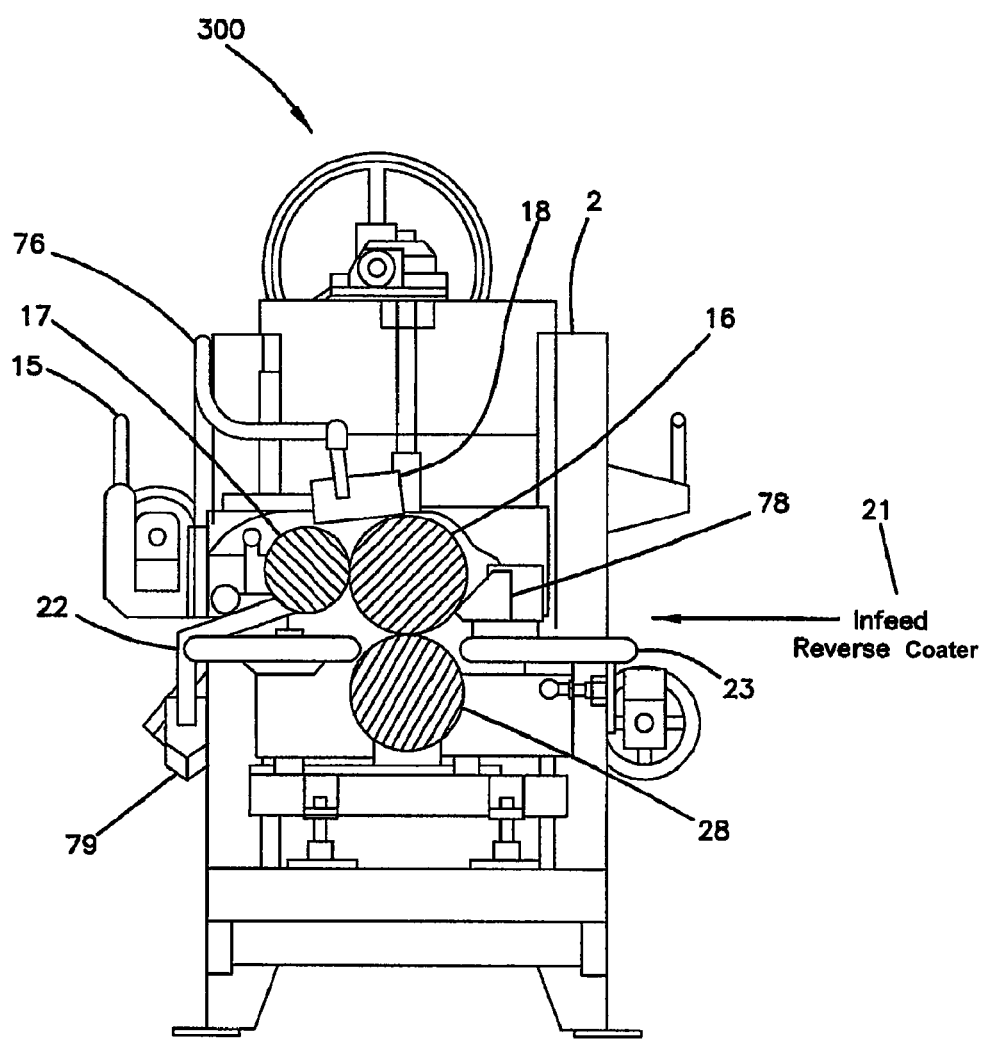
FIG. 3 is an illustration of a reverse roll coater used in one embodiment.

Roll Coaters. FIG. 3 is an illustration of a reverse roll coater 300 that may be used, according to embodiments of the present invention, in order to deliver a coating to a substrate. Roll coater 300 includes frame 2 that supports chrome plated coating roll 16, and chrome plated doctor roll 17, which delivers a slurry to the coating roller. The thickness of the coating layer may be controlled by adjusting the nip dimension between the coating roller 16 and the doctor roller 17 and by adjusting the speed at which the coating roller 16 rotates relative to the movement of the substrate. Slurry material is delivered to the area between the rollers 16, 17 and nip guard 18 by material feed line 76. A substrate (not shown), such as a OSB or plywood panel, is fed into roll coater 300 via in-feed, which includes fixed feed table 22. The substrate is coated with a slurry as it passes between coating roll 16 and resilient feed roll 28, and the coated substrate exits roll coater 300 via fixed out-feed table 22. Any excess material reaching the area of the out-feed table 22 is collected in material overflow system 79 and recycled. According to embodiments of the present invention, roll coater 300 may be used to apply a first coating of fire-resistant material to a substrate and/or may be used to apply a third layer of fire-resistant material over previously deposited layers on a substrate. Alternatively, other coaters such as flow coaters may be substituted for the reverse roll coater for the application of a first or third layer of fire-resistant material.

Figure 4:
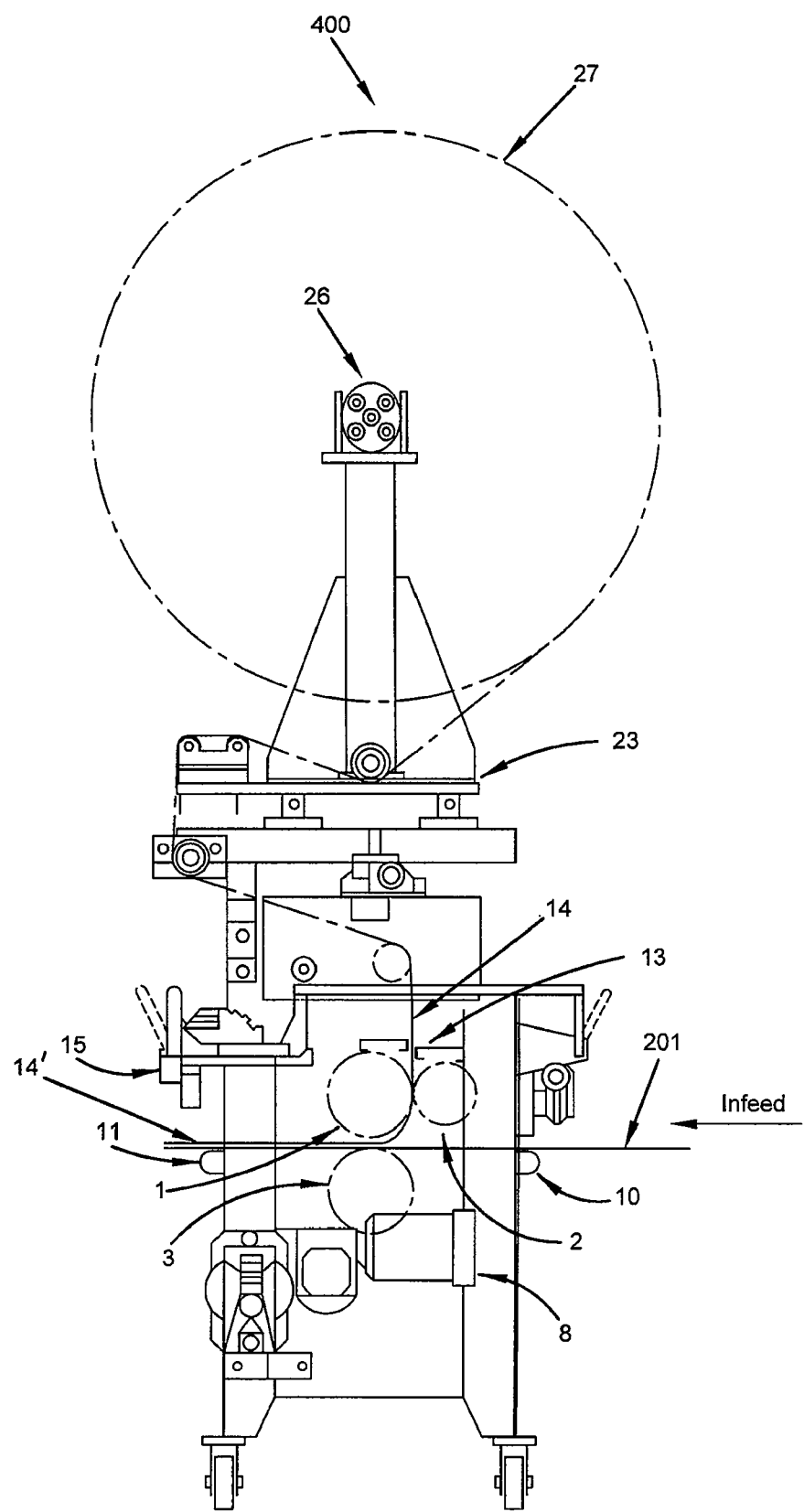
FIG. 4 is an illustration of a top roll coater that includes an unwind stand for supporting a web or continuous roll of veil material for impregnation with fire-resistant slurry and subsequent placement on a substrate.

FIG. 4 is an illustration of a top roll coater 400 that includes an unwind stand 26 for supporting roll 27 of pliable veil of fibrous material for subsequent delivery to a substrate via an impregnated sheet of veil or carrier material. Top roll coater 400 is used to deliver the second veil-borne layer of fire-resistant material to a substrate. Material from roll 27 passes along an edge guide alignment system 23, which may utilize an optical sensor in order to confirm that the material will align with a substrate passing through roll coater 400. From edge guide alignment system 23 the material passes between pivoting roll nip guard 13 and into a "virtual bath" area (the roller area just above the nip) holding viscous fire-resistant fluid. The viscous fire-resistant fluid is drawn into the veil material and coats the fibers, and the amount of fluid that impregnates the material is determined by the space between coating roller 1 and doctor roller 2. Once the coated material passes between rollers 1 and 2, the coated veil material is coupled to a substrate, i.e., an OSB or plywood panel, passing through roll coater 400 via in-feed table 10.

Immediately before the substrate enters roll coater 400, the substrate may be coated with a viscous fire-resistant material, e.g. via reverse roll coater 300. In this case, the coated material from roll coater 400 combines with the uncured/undried first coating of fire-resistant material on the substrate as it passes between coating roll 1 and feed roll 3. Because the fire-resistant material from both the veil material and the substrate are wet and uncured, and because the wet fire-resistant material includes adhesive properties, blending the two coats of material into an intimate combination may be accomplished without the necessity of additional glues or adhesives. Subsequent to coupling the coated substrate and saturated veil material, the substrate exits roll coater 400 via out-feed table 11. Because the substrate/pliable veil material interface arises as the coated substrate is moving through roll coater 400, roll coater 400 is able to deliver the pliable sheet of material to the substrate without positive pressure; instead the pliable sheet material need only be unwound from roll 27. Gravity helps pull the impregnated veil down to the coated substrate and friction and surface tension hold the impregnated veil onto substrate. The impregnated veil is delivered to the substrate at the same rate the substrate moves in an advancing direction through roll coater 400. Roll coater 400 may be powered by any suitable means including via a drive motor 6.

Figure 5:
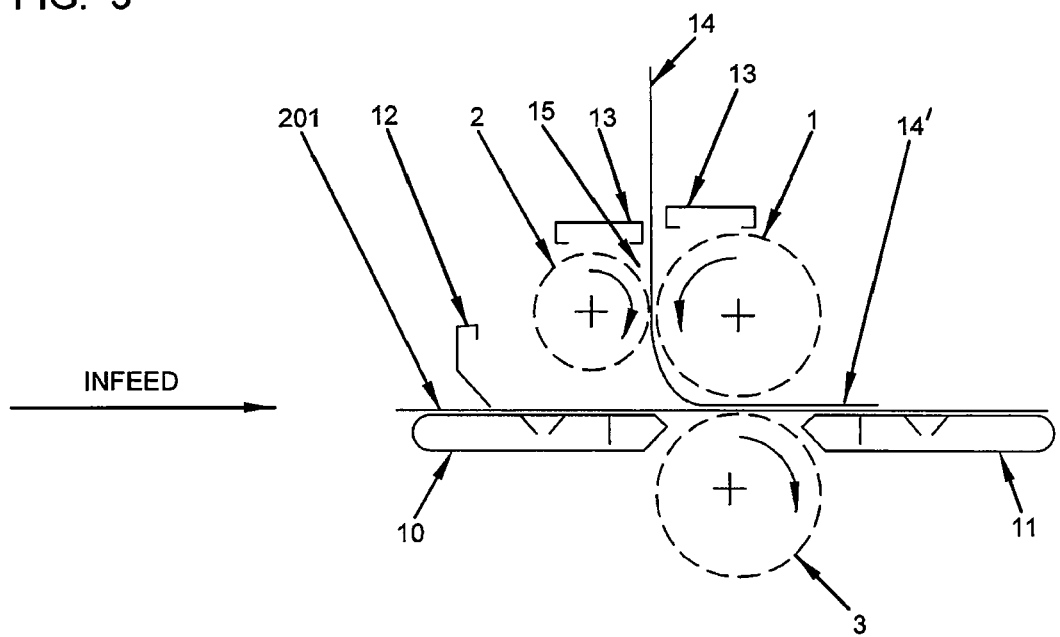
FIG. 5 is a view of a roll coater that coats a fire-resistant slurry onto a carrier veil.

FIG. 5 is a view of the area of roll coater 400 that delivers a fire-resistant slurry impregnated veil material to a substrate. In order to become impregnated, the material 14 passes nearly vertically through a "virtual bath" 15 which is defined by the roller area above the nip of rollers 1 and 2. Slurry material is sprayed, poured, or otherwise deposited in an area just below pivoting roll nip guard 13 at a set rate that allows enough slurry to be present for the material 14 to become impregnated with slurry in the "virtual bath" 15, while at the same time ensuring that the "virtual bath" 15 area does not overflow. The "virtual bath" 15 is maintained on the edges of the rollers by additional nip guards (not shown), which serve as dams to keep slurry material from spilling off of the side of the rollers. According to FIG. 5, a substrate material 14 to receive the impregnated material enters roll coater 400 at in-feed table 10 where it passes under barrier guard 12 and doctor roll 2. The impregnated veil material is delivered to the substrate from the "virtual bath" 15 area between coating roller 1 and doctor roller 2. Feed roller 3 rotates in a direction that leads the substrate through roll coater 400. The slurry-coated substrate material 14' passes out of roll coater 400 via out-feed table 11. Roll coater 400 delivers fire-resistant slurry to a veil material 14 as it passes vertically, or generally vertically into the "virtual bath" 15.

Figure 6:
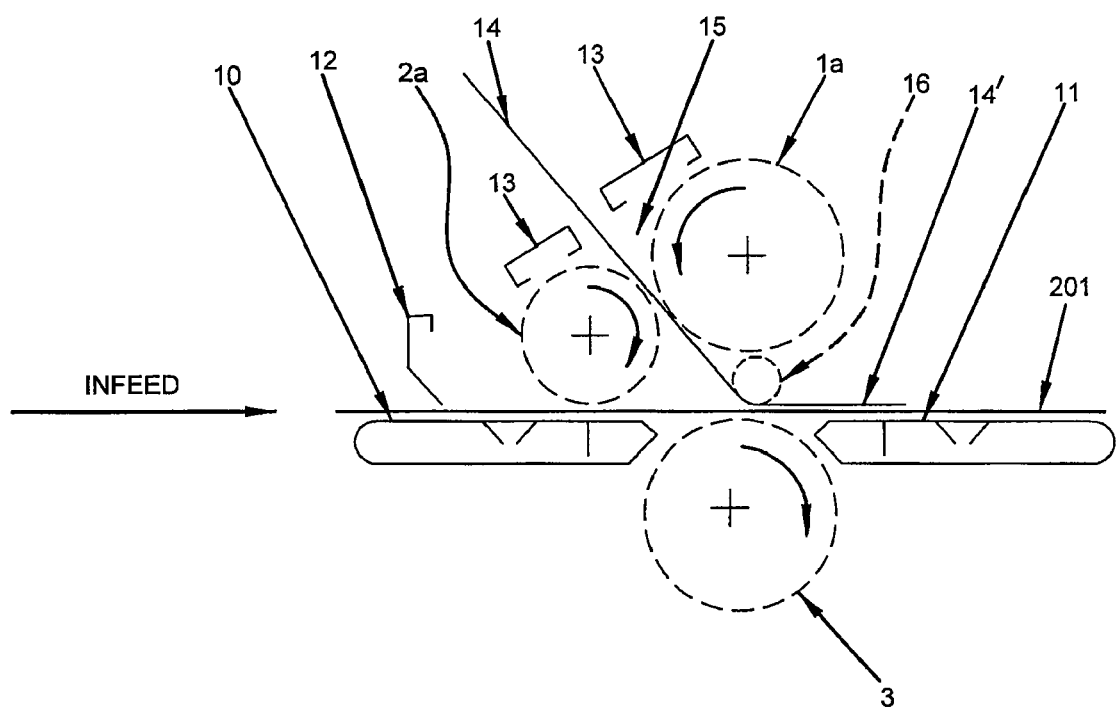
FIG. 6 is a is a view of an alternate roller pair that coats a fire-resistant slurry onto a carrier veil.

FIG. 6 is a is a view of the area of roll coater 400 that delivers a fire-resistant slurry using an alternate roller pair that coats a fire-resistant slurry onto a carrier veil. The components of FIG. 6 that are the same as FIG. 5 are numbered in the same fashion as FIG. 5. Whereas in FIG. 5, the axes of the rollers 1 and 2 of the roll coater are in approximately the same horizontal plane, in FIG. 6, the axis of one roller, roll 1a, is higher than the other, roll 2a. This permits the veil material 14 to approach the roller nip at a non-vertical, acute angle to receive the slurry coating. The slurry is fed to the upper side of the nip, just below pivoting roll nip guard 13. The positioning of the rollers permits a reservoir of material to reside in the nip thereby forming "virtual bath" 15. This angle of approach may be useful in some environments and permits the web to exit in a direction that is more aligned with the direction of travel of a substrate. The coated veil 14' exits the coater out-feed table 11. In some embodiments, an additional guiding roller 16 guides the coated veil 14' to out-feed table 11. This may enable the coated veil 14' to be controllably coupled to the substrate passing through the coater via infeed table 10.

The fire-resistant mixture may vary according to differing conditions on the production line. The mixture typically will have a MgCl brine that has a specific gravity between 1.22-1.26, but also includes an amount of $H_2O$ in order to prevent it from being "water starved," which may involve adding "water of convenience" before coating processes. The amount of "water of convenience" added depends on the varying conditions of the production line. Each coater 300, 400 receives a supply of slurry from a mixing station. The slurry is delivered from the mixing station to a slurry holding tank from where it is pumped to individual tanks at each coating station. Depending on the function of the coater, the slurry is delivered to the surface of one or more rollers or to a "virtual bath." When delivered to the roller surfaces, the nip and the speed of the roller determine the thickness of the layer deposited on the substrate. When delivered to the "virtual bath," which is considered the area defined by the nip area and the roller area above the nip, the thickness of the resulting impregnated veil layer depends on the nip and on the properties of the veil material to be impregnated in the "virtual bath." It should be noted that although the nip area in the "virtual bath" will be slightly wider than the veil material, slurry will not freely flow through the nip, because the veil passing between the rollers blocks the viscous slurry from freely exiting the nip and allows the virtual bath to be maintained in the roller area above the nip. Excess slurry material in both coater 300 and 400 is collected in a drip pan where the slurry is pumped away and recycled.

Figure 7:
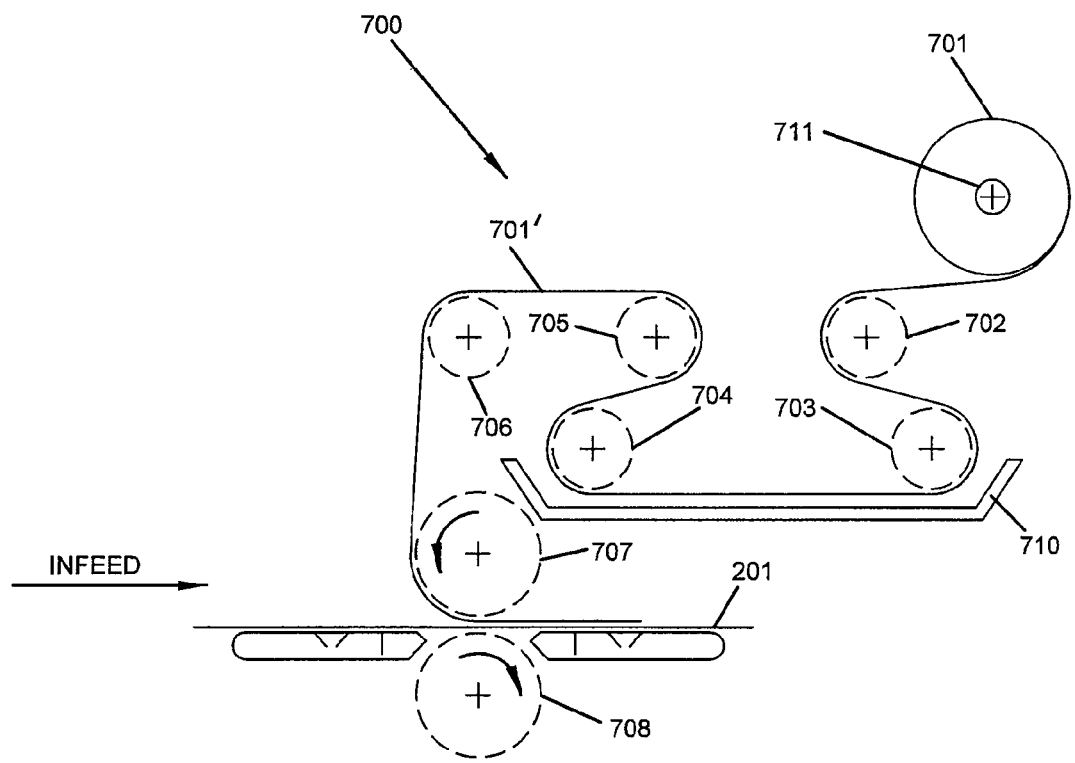
FIG. 7 is a view of a pan bath for coating a fire-resistant slurry onto a carrier veil.

Various coaters may be used to coat fire-resistant materials on and into pliable veils to saturate them thoroughly. For example, FIG. 7 is an illustration of pan bath coater 700 which may be used to coat a pliable veil. The pan bath 710 of pan bath coater 700 is a container-defined bath (e.g., pool in a rectangular pan) that contains a slurry of fire-resistant material (not shown). According to this example, the veil material 701 is delivered from a spindle roll 711 to the pan bath 710 via a series of rollers 702, 703. The rollers 702, 703 are configured to enable the veil material 701 to be threaded around the rollers so that the veil material 701 is directed into the pan bath 710 where the veil material 701 runs through the bath and is impregnated by the fire-resistant material. The impregnated veil material 701' is then threaded through another series of rollers 704, 705 that direct the impregnated veil out of the pan bath and to a next processing area. In FIG. 7, as the impregnated veil passes out of the bath via rollers 704, 705, above the terminal end of the bath, the impregnated veil 701' is directed to a substrate (not shown) via rollers 706, 707 for subsequent bonding with the substrate and is directed out of pan bath coater 700 via feed roller 708.

Results. According to methods described above, a fire-resistant panel is produced faster and more efficiently, because a coated mat or veil, such as a fiberglass mat or veil, is applied to the substrate, such as an oriented strand board or plywood panel without producing a large amount of excess. The mat or veil is impregnated and/or coated with fire-resistant material and then disposed on a surface of a substrate. This method of fire barrier panel production provides advantages over other methods because the production steps that coat and lay the mat or veil on the substrate may avoid repetitive spraying and/or "overspraying" of the cementitious fire-resistant materials, thereby yielding a cleaner manufacturing process. In addition, the mat or veil coated with fire-resistant materials may be precisely placed on the substrate in order to prevent or reduce the amount of material that extends beyond the substrate, thereby reducing waste. Further the mat or veil may be impregnated with selected, predictable amounts of fire-resistant material so that targeted fire resistance result may be achieved. Finally, the cured fire-resistant layers may add strength to the coated substrate panel, such that the coated panel will deflect less and be less damaged by deflection agents such as wind, snow, and/or seismic loads.

Further, according variations of the methods described above, the fire-resistant products that may be produced include a cured magnesium oxychloride complex that is materially coupled to the mat or veil. Material coupling, for purposes of the present invention, includes associating with, contacting, adhering to, becoming integral with, embedding, migrating, saturating, impregnating, coating, or the like. According to certain embodiments, the complex may comprise $MgCl_2 \cdot mMg(OH)_2 \cdot nH_2O$; where m is between about 3 and about 7, and n is between about 6 and about 10. In other embodiments, m is between about 4 and about 6, and n is between about 7 and about 9. In a particular embodiment, m is about 5 and n is about 8 which yields a fire barrier product with a desirable level of stability, hardness, and amount of $H_2O$ within the cured complex. Furthermore, it has been found that in the particular embodiment described above, where m is about 5 and n is about 8, the magnesium oxychloride complex when combined with a mat or veil and with wood or cellulosic-based materials, achieves desirable fire-barrier performance. Additional embodiments may include depositing further layers of the magnesium oxychloride complex over or on the mat or veil, or over or on the wood or cellulosic-based materials in order to yield fire-barrier products having a desirable property, such as a desirable thickness or texture. Depositing layers over or on mat or wood, according to the present invention includes depositing a layer that makes contact with the mat or wood, which may include a top surface of the mat or wood, for example.

In yet a further embodiment, a mat or veil having been impregnated with a slurry may be coated with a further layer of slurry which may then be partially cured and used in subsequent applications, or may be fully cured, in which case the product may or may not be used in subsequent production processes. Used in subsequent production processes, the magnesium oxychloride may form a layered fire-resistant product on a substrate. Such a product may include a glass-based web; a magnesium oxychloride complex materially coupled to the web, where complex is: $MgCl_2 \cdot mMg(OH)_2 \cdot nH_2O$; where m is between about 3 and about 7, and n is between about 6 and about 10; a layer of magnesium oxychloride complex materially coupled on the web, in which the complex comprises: $MgCl_2 \cdot mMg(OH)_2 \cdot nH_2O$; where m is between about 3 and about 7, and n is between about 6 and about 10; and a substrate materially coupled to the layer of magnesium oxychloride complex. It should be understood that the uncured precursors to the magnesium oxychloride complex are used to impregnate and subsequently coat the web, and therefore, the slurry in the web and the slurry of the slurry layer are able to form a continuous materially bond over the entire substrate.

Utilizing a web of mat or veil material with the magnesium oxychloride complex provides a layer of fire barrier material with reinforcing properties and added structural strength over non-continuous coatings of fiberglass because of the continuous nature of the mat or veil. Accordingly, a lesser weight of fiberglass mat or veil provides an equal or greater amount of structural strength over the non-continuous coating of fiberglass.

The performance of a fire barrier product having $MgCl_2 \cdot mMg(OH)_2 \cdot nH_2O$ ideally drives off chemically bonded $H_2O$ molecules at about 450° F. or 230° C., and at about 1200° F. or 650° C., the $Mg(OH)_2$ molecule begins to revert to MgO and H2O, releasing the bound hydroxide molecules and thereby enabling additional $H_2O$ to be shed at higher temperatures.

While the present invention has been described in the context of coating and impregnating fire-resistant substances on and in materials, it should be understood that any substance may be used to coat materials using methods according to the present invention. For example, generally cementitious slurries may be used to coat webbed materials. However, any suitable viscous material may be used to coat pliable fabrics according to methods of the present invention. Variables in production lines may also be altered in order to yield a desirable product using the coating methods of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

All patents, patent applications, publications, and references cited herein are expressly incorporated by reference to the same extent as if each individual publication or patent application was specifically and individually indicated to be incorporated by reference.

What is claimed is:

1. A system for coating a cementitious fire-resistant substance onto a substrate, the system comprising:
   a nip formed between two rollers;
   a veil supply that supplies to the nip a pliable carrier veil;
   a mixing station for mixing MgCl brine and water to form the cementitious fire-resistant substance;

a material supply line for supplying said cementitious fire-resistant substance to the nip in slurry form, to form a reservoir of said cementitious fire-resistant substance defined by said nip of two rollers;

adjusting means for setting a nip dimension between said two rollers such that the two rollers exert a pressure on the pliable carrier veil that provides an amount of the cementitious fire-resistant substance in and on said pliable carrier veil to form a veil layer;

delivery means for delivering the veil layer to couple with a surface of the substrate, wherein the substrate and delivery means are supported for motion relative to each other;

a heater for applying an initial amount of heat to the veil layer sufficient to accelerate curing in the cementitious fire-resistant substance;

transport means for transporting the coupled veil layer and substrate out of the heater; and a control center for controlling a fire resistance of the substrate having the cementitious fire-resistant substance, wherein the control center controls an amount of water mixed with the MgCl brine at the mixing station, controls a rate of delivery of the cementitious fire-resistant substance from the material supply line, controls an amount of pressure exerted on the pliable carrier veil by the nip, controls a rate at which the veil layer is delivered from the nip, controls the initial amount of heat applied by the heater to the veil layer, or controls a transport rate at which the transport means transports the coupled veil layer and substrate.

2. The system according to claim 1, wherein the control center senses ambient conditions and in response controls the amount of water mixed, the rate of cementitious fire-resistant substance supplied, the amount of pressure exerted on the pliable carrier veil, the rate of veil layer delivery, the initial amount of heat applied, or the transport rate.

3. The system according to claim 1, wherein the adjusting means sets the nip dimension further corresponding to a selected carrier veil thickness.

4. The system according to claim 1, further comprising a moving means for moving the substrate at the same rate as the delivery means delivers the veil layer such that the veil layer and substrate are coupled in a continuous feed.

5. The system according to claim 1, wherein the transport means removes the coupled veil layer and the substrate from the accelerating heat after a predefined initial heating to control water loss from the veil layer.

6. The system according to claim 1, further comprising a substrate pre-processing means for pre-processing the substrate surface prior to the substrate receiving the veil layer, said pre-processing means increasing a substrate surface area available for bonding with the cementitious fire-resistant substance.

7. The system according to claim 6, further comprising a depositing means for depositing a layer of cementitious fire-resistant substance on the pre-processed substrate in slurry form to initiate a penetrating process of the cementitious fire-resistant substance into the pre-processed substrate, wherein the delivery means delivers the veil layer on the deposited layer of cementitious fire-resistant substance.

8. The system of claim 1, wherein the substrate is supported at the delivery means by a feed roller or a conveyor.

9. A system for coating a cementitious fire-resistant substance onto a substrate, the system comprising:

a substrate coater for depositing a layer of cementitious fire-resistant substance on the substrate in slurry form to initiate a penetrating process of the cementitious fire-resistant substance into the substrate, wherein the substrate and the substrate coater are supported for motion relative to each other;

a veil coater for coating an amount of the cementitious fire-resistant substance in a slurry form onto a pliable carrier veil such that the cementitious fire-resistant substance is deposited in and on said pliable carrier veil to form a veil layer, wherein the veil coater delivers the veil layer uncured to the substrate such that the substrate and veil layer are coupled by the cementitious fire-resistant substance on the veil layer and on the substrate blending to form a continuous layer, wherein the substrate and the veil coater are supported for motion relative to each other;

an oven for applying an initial amount of heat to the coupled substrate and veil layer for initiating a curing reaction in the cementitious fire-resistant substance;

a transport means for transporting the coupled substrate and veil layer from the oven to remove the accelerating heat and allow the blended layer of cementitious fire-resistant substance to slow cure to promote a cementitious bond with the substrate surface; and a controller for providing a selected fire resistance to the substrate coupled with the veil layer by controlling the amount of said cementitious fire-resistant substance the veil coater deposits in and on said pliable carrier veil, controlling an amount of slurry form of cementitious fire-resistant substance deposited by the substrate coater on the substrate, controlling a rate at which the uncured veil layer is delivered by the veil coater to the substrate, controlling an intensity of the initial amount of heat applied by the oven, or controlling a transport rate of the transport means to control a period of time the initial amount of heat is applied to the coupled substrate and veil layer.

10. The system of claim 9, further comprising a sensor for sensing the initial amount of heat applied by measuring a surface temperature of a top surface of the substrate coupled with the veil layer.

11. The system of claim 10, further comprising a comparator for comparing the measured surface temperature with a target surface temperature and using the transport means to transport the substrate coupled with the veil layer from the oven upon the top surface reaching the target surface temperature.

12. The system of claim 11, wherein the controller controls a temperature, humidity, or air speed in the oven in connection with applying the initial amount of heat.

13. The system of claim 9, further comprising a sensor for sensing an ambient condition, wherein the selected fire resistance is provided by the controller adjusting one or more of the amount of said cementitious fire-resistant substance the veil coater deposits in and on said pliable carrier veil, the amount of slurry form of cementitious fire-resistant substance deposited by the substrate coater on the substrate, the rate at which the uncured veil layer is delivered by the veil coater to the substrate, the intensity of the initial amount of heat applied by the oven, or the transport rate of the transport means.

14. The system of claim 9, further comprising a pre-processing station for increasing a surface area available for bonding with the cementitious fire-resistant substance prior to the substrate being received by the substrate coater.

15. The system of claim 14, wherein the pre-processing station comprises a scuff sander, the substrate is comprised of cellulosic material, and pre-processing the substrate comprises opening interstitial spaces in the cellulosic material by scuff sanding such that the deposited layer of cementitious fire-resistant substance on the pre-processed substrate initiates a penetrating process of the cementitious fire-resistant substance into the interstitial spaces.

16. The system of claim 9, further comprising a first weighing station for weighing the substrate prior to the substrate being coated by the substrate coater, and a second weighing station for weighing the coupled substrate and veil layer, wherein the selected fire resistance is verified by comparing a weight of the substrate prior to being coated with a weight of the coupled substrate and veil layer.

17. The system of claim 9, wherein the veil coater comprises at least one of a reverse roll coater or a top roll coater, and wherein the reverse roll coater or the top roll coater exerts a pressure on the pliable carrier veil and provides the amount of the cementitious fire-resistant substance in and on said pliable carrier veil to form the veil layer.

18. The system of claim 9, wherein the veil coater comprises a pan bath, and the amount of cementitious fire-resistant substance in and on said pliable carrier veil is determined by a pliable carrier veil dwell time in the pan bath.

19. The system of claim 9, wherein the veil coater comprises a roll coater, wherein an axis of a first roller of the roll coater is higher compared to an axis of a second roller of the roll coater such that the pliable carrier veil approaches the roll coater at a non-vertical, acute angle, which enables the pliable carrier veil to exit the rollers in a direction that is partially aligned with a direction of substrate travel.

20. The system of claim 9, wherein the substrate is supported at the substrate coater and the veil coater by a feed roller or a conveyor.

* * * * *